United States Patent
Marggraf et al.

[15] 3,672,232
[45] June 27, 1972

[54] TWO AXIS GAS BEARING ACCELEROMETER

[72] Inventors: Kurt A. Marggraf, Tonawanda; Ernest Metzger, Eggertsville, both of N.Y.

[73] Assignee: The United States of America as represented by the Secretary of the Air Force

[22] Filed: June 2, 1970

[21] Appl. No.: 42,647

[52] U.S. Cl. ............................................................73/516 R
[51] Int. Cl. ......................................................G01p 15/08
[58] Field of Search ............................................73/516, 517

[56] References Cited
UNITED STATES PATENTS

| | | | |
|---|---|---|---|
| 3,520,197 | 7/1970 | Blanding et al. | 73/516 |
| 3,237,456 | 3/1966 | Shaw, Jr. | 73/503 |

*Primary Examiner*—Richard C. Queisser
*Assistant Examiner*—Herbert Goldstein
*Attorney*—Harry A. Herbert, Jr. and Ruth G. Codier

[57] ABSTRACT

A new type of rugged two axis gas bearing accelerometer wherein the gas bearing is piezo-electrically actuated, the mass sensor is a simple flat metal washer which is suspended between two sets of piezo-electric ceramic parts, the pick off is a conventional capacitance pick off and the forcer principle is electro-dynamic.

1 Claim, 2 Drawing Figures

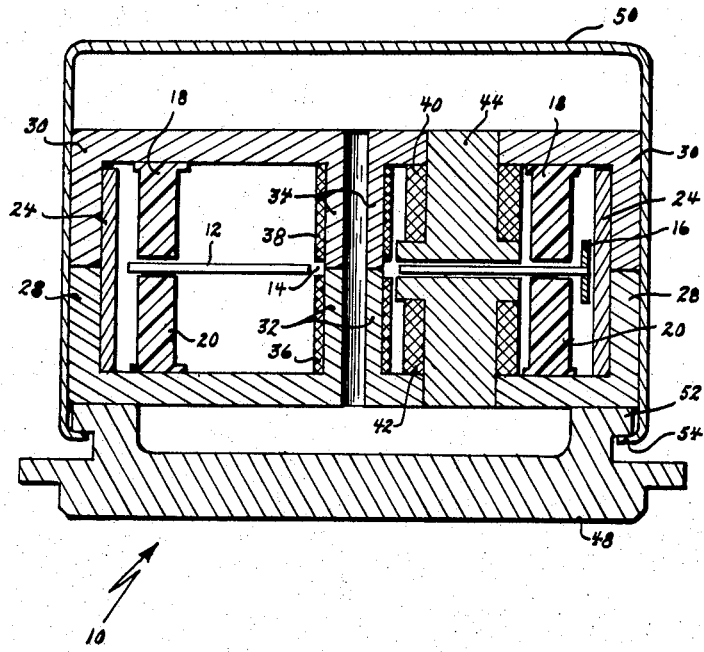

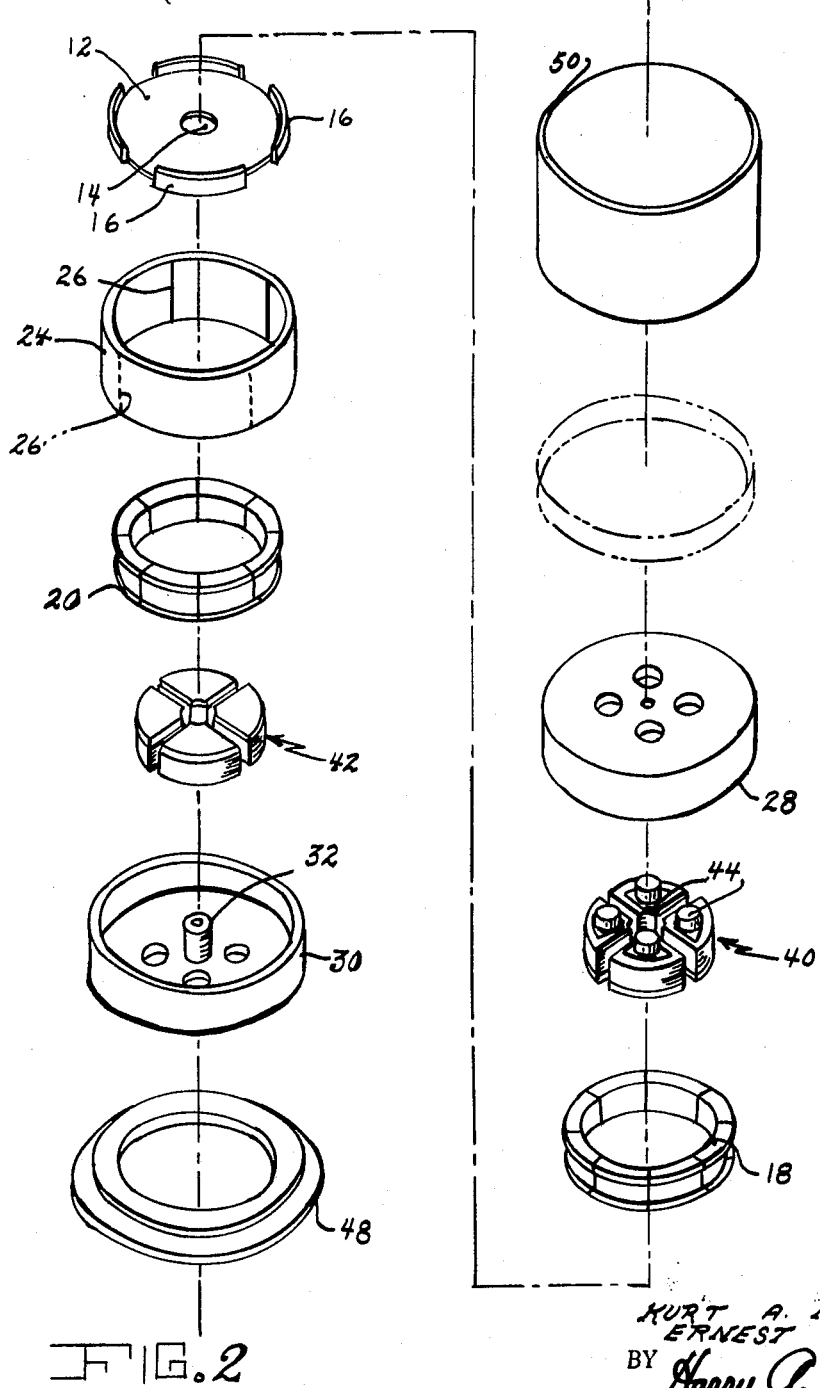

TWO AXIS GAS BEARING ACCELEROMETER

BACKGROUND OF THE INVENTION

This invention relates to a two axis gas bearing accelerometer and particularly to a gas bearing which is piezo-electrically actuated, and wherein the sensor mass is a simple flat metal washer which is suspended between two sets of piezo-electric ceramic parts, the pick off is a conventional capacitance pick off and the forcer principle is electro-dynamic.

The equipment available is a single axis accelerometer which is complicated, extremely delicate to manufacture and maintain and therefor extremely costly. The factors which contribute to the high cost can be summarized as follows: (1) complexity—many parts and many types of parts; (2) unique parts which are complex in themselves and therefore difficult and expensive to fabricate; (3) exotic materials which are costly and require special handling; (4) precision parts requiring extreme accuracy in fabrication, resulting in low yield and high cost; (5) manufacturing and assembly processes which require state-of-the-art type control.

The accelerometer now available comprises, in general, six systems, each system being a delicate and complex structure.

The six systems which constitute the single axis accelerometer of the prior art, and each of which the invention proposes to simplify are as follows:

1. Proofmass—or sensor mass disc

The presently available sensor mass is a complex beryllium cylindrical proofmass which has to have legs. A fine wire coil is wound on cylinder with terminals soldered to suspension springs. Both inside diameter, inside flange, and groove for coil have to be accurately held. The soldering process is delicate.

2. Suspension System

Two delicate springs are required to be soldered, by a critical process, to the sensor mass legs. Manufacturing of these springs is a precision operation. One end of springs have to be attached to the mounting base, with electrical insulation provision, since the suspension springs also serve as electrical connection for the coil. Cross-coupling of suspension force is extremely critical as to the centered or null position of the sensor mass. Maintaining zero force cross-coupling from the suspension spring into sensitive axis subsequent to temperature cycles presents yield (cost) problem.

3. Pick Off System

Capacitive pick off consists of two capacitive pick off rings precisely positioned with respect to proofmass, depending on null force, position of suspension system. Fairly involved attachment and adjustment procedure.

4. Forcing System

Permanent Magnet — DC Forcing — The magnets are expensive and require special aging and handling procedures. Their heavy weight requires special mounting provisions to withstand vibration and shock. The magnets also require accurate placement. Magnet strength is also temperature sensitive and reduces as a function of time.

5. Case

All parts of the instrument are mounted directly to the cast precision machined case. It is complex with many precision surfaces, holes, and diameters.

6. Temperature Control

Even with temperature compensation, a temperature control system is required because of temperature sensitivity of the magnets.

SUMMARY OF THE INVENTION

It is the object of the present invention to provide a two axis accelerometer comprised of five of the six systems above noted. Each of the five systems are greatly simplified, most of them having no precision requirements and presenting no special problems in either manufacture or assembly. The sixth system which involves temperature control is dispensed with altogether.

1. The proofmass or sensor disc, in place of the complex system heretofor available, is a one piece disc, preferably of aluminum with a segmented flange. The only important accuracy necessary is the flatness of the disc.

2. The suspension system for the proofmass is a Piezo Electric-vibratory suspension which requires no physical or electrical connection to the proofmass. The piezo-electric suspension rings are simple to manufacture. Only one surface of each ring required accurate grinding. The air gap, set by special technique, requires no manufacturing process because of the characteristics of the piezo-electric crystal.

3. The pick off system comprises a cylindrical tube with metalized and segmented inner-diameter surface. This pick off cylinder has no tight tolerance requirements.

4. Eddy current forcing system, using AC excitation, is inherently digital. Excitation coil for the primary current is mounted on a center part and has no special tolerance requirements. The two forcer assemblies are also simple and require no special tolerances. The gap between opposing forcer coils is important and is held constant, independently of temperature, by the proper design of the case. The need for a temperature control system being thereby eliminated.

5. The case which houses the above noted elements is comprised of a pair of E-Cores which serve the dual function of mounting all elements of the accelerometer including part of the magnetic circuit. The E-Core elements are standard ferrite moldings, and only the facing surfaces of each have to be ground.

6. As before noted, no temperature control is required. The instrument has potentially instantaneous reaction from a cold start.

These and other advantages, features and objects of the invention will become more apparent from the following description taken in connection with the illustrative embodiments in the accompanying drawings.

DESCRIPTION OF THE DRAWING

FIG. 2 is an exploded view of the component parts of the device.

DESCRIPTION OF THE PREFERRED EMBODIMENT

Figure 1:
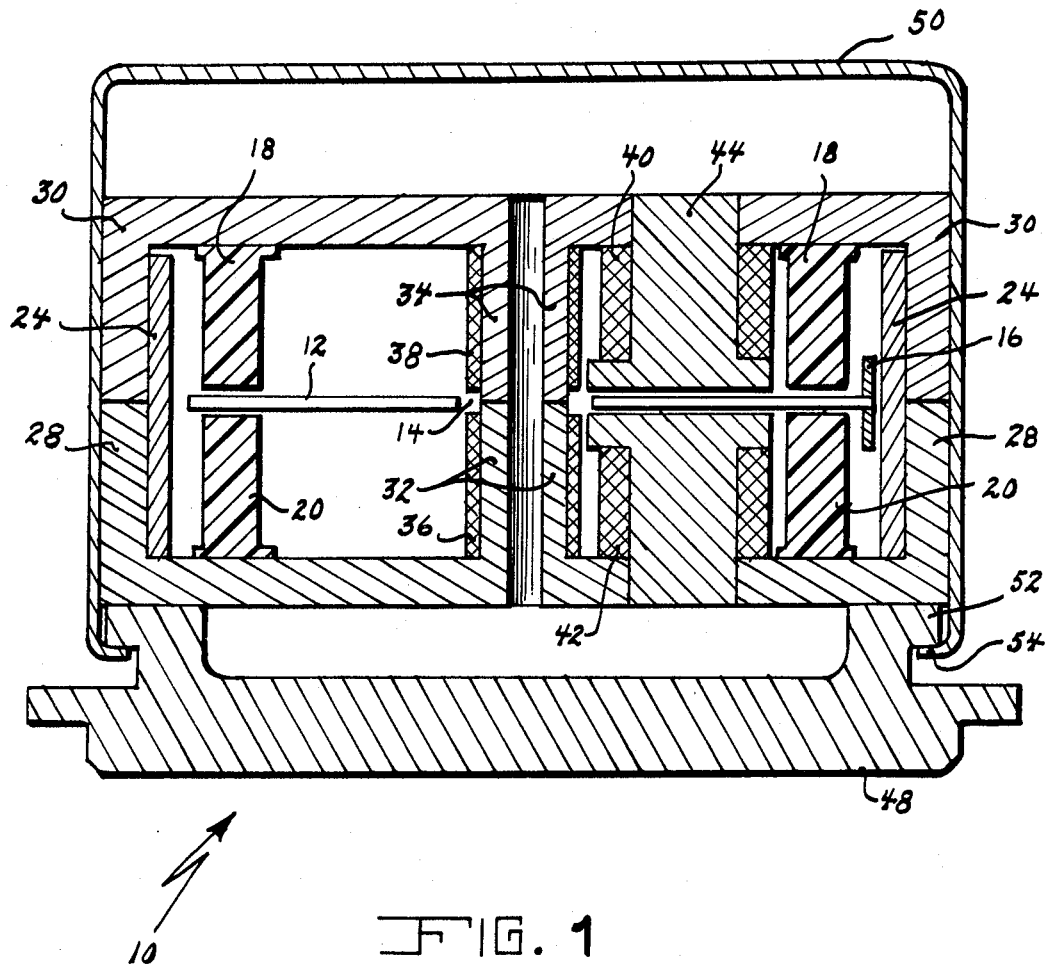
FIG. 1 is a cross sectional view of the two axis accelerometer, with portions omitted for clarity.

The accelerometer is indicated generally by the numeral 10. The sensor mass 12 is a flat metal washer with a circular opening 14 located at its center. The segments 16 of a cylindrical flange are integral with the sensor mass disc 12 and are located around its outside circumference. The accurate perpendicularity of the segments 16 is not crucial from a precision point of view.

In operation the sensor mass 12 is suspended in a vibrating gas bearing and is free to move in any direction within the plane of the disc 12. The sensor mass 12 is thus sensitive to accelerations along two input axes and is therefore a dual axis device.

This is accomplished by suspending the sensor disc 12 in a vibrating gas bearing between two segmented piezo-electric crystal rings 18 and 20 which provide vibratory excitation. The rings 18 and 20 are mounted in, but electrically isolated from, the ferrite outer case 28–30 in which the elements of the accelerometer are mounted. The rings 18 and 20 are preferably ceramic, with metalized faces. The gas gaps between the ceramic crystal faces of the elements 18 and 20 and the sensor disc 12 can be made very rigid to suspend the sensor mass 12 against any practical vibration or steady state acceleration or shock, or the suspension capability may be adjusted to a strength merely capable of suspending the sensor mass 12 in a near zero gravity field. A simple change of the excitation voltage effects a modification in the suspension capability. The operation is instantaneous and has low power requirements. It will be apparent that delicate spring systems and the associated problems of fatigue and wearing are dispersed with. The sensor disc 12 is free floating, requiring no attachments. The expansion characteristic of the crystals 18 and 20 under applied voltage offer a simple means of adjusting the space gap.

The pick off system where function is to sense the position of the sensor mass comprises the flange segments 16 previously described as perpendicular segments attached to the circumference of the sensor disc 12, in conjunction with a cylindrical sleeve 24. The sleeve 24 is rigidly mounted in the outer case 28–30. Any displacement of the sensor disc 12 generates two signal components.

The inside of the pick off cylinder 24 has four equal quadrants, indicated at 26 each plated with a metallic surface. No special precision requirement is imposed on the cylinder 24 since the suspension forces are largely independent of the position of the sensor mass.

Four capacitors 26 are thus produced with the proofmass or sensor disc 12 as the common plate. The diametrically opposite capacitors 26 are connected in a wheatstone capacitance bridge. As the sensor disc 12 moves along an input axis, one capacitance is increased while the opposite capacitance is decreased. This produces an unbalance in the bridge that is proportional to the displacement of the sensor mass 12 from centered or null position.

The Forcing System is based on the forcer principle which is electro-dynamic; that is, a forcer magnetic field density interferes with a steady current flow in the sensor disc 12.

The sensor disc or proofmass 12 is rebalanced by an eddy current forcing system which requires no physical connections to the proofmass 12, eliminating costly and delicate equipment or bulky permanent magnets. A special temperature compensation scheme has been devised which makes the forcing independent of the temperature.

In order to generate the current in the sensor 12 without use of conductor leads, a transformer configuration is used which induces the necessary sensor current without applying force to it.

The magnetic transformer structure is composed of two E cup cores 28 and 30 which serves also the function of a ferrite shell for mounting all of the elements of the device. The shell elements 28 and 30 are formed with mating central core elements 32 and 34 which form a central post around which are wound an excitation coil. See FIG. 1.

The sinusoidal primary magnetic field cuts through the sensor disc 12 periodically and generates the sensor current. The current value is independent of the sensor position because of an enclosed secondary turn (not shown) which is cut by the total primary field.

The forcer coil assembly is comprised of two complementary capacitive elements 40 and 42. Two sets of four poles each (see 44 FIGS. 1 and 2) are thus aligned with the respective sets of capacitors in the space around the center pole excitation coils 36 and 38, forcer coils 40 and 42 surround each pole 44.

An alternating current input applied to one set of forcer coils 40 generates a forcer field density between the pole faces which in turn interferes with the secondary current flowing in circular paths in the sensor element 12.

The whole package is mounted on a plate 48. The plate 48 and a cover 50 are provided with interengaging shoulder and rim elements. A secure package is obtained. This type of forcer is adaptable to three different kinds of feedback modes:

Mode 1 is an amplitude modulated (analogue) operation, where the phase of the forcer field is kept equal to the sensor current phase, but the amplitude is always proportional to the pick-off signal.

Mode 2 is phasemodulated (also analogue) operation, where the amplitude of the forcer field is kept constant but the phase of this field is biased proportional to the pick-off signal.

Mode 3 is a time modulated operation (digital) where the amplitude of the forcer field is always constant and the forcer phase always equal or in opposition to the sensor current phase, which depends on the polarity of the acceleration input. But this condition exists only as long as the acceleration sensor mass is deflected to or beyond the trigger level by the input acceleration.

The trigger level initiates a burst of full sine waves to counteract the acceleration input, which caused the sensor to be shifted to the trigger level.

The number of counted sine waves per unit of time is then proportional to the input acceleration, while each counted sine wave represents one velocity increment.

In a fluid filled accelerometer, a smooth operation is guaranteed because of sufficient damping. Sufficient damping is not natural in a gas or air filled accelerometer. An artificial damping is made by differentiating the demodulator output signal, process the DC damping signal to an amplitude modulated forcer signal, which is superimposed to the constrainment signal of any mode it may be.

The two halves of an accelerometer are made semi-solid by a filling of all empty spaces with a slightly flexible Epoxy or a silicon rubber, which can encapsulate also the vibrating piezoelectric ceramics without determining their function.

The operation of this accelerometer is adaptable to a variety of requirements in terms of constrainment mode, acceleration ranges, and sliding range operation.

Although the invention has been described with reference to a particular embodiment, it will be understood to those skilled in the art that the invention is capable of a variety of alternative embodiments within the spirit and scope of the appended claims.

I claim:

1. In a dual axis accelerometer having a flat disc sensor element and a vibratory suspension system for free suspension of said sensor element, the improvement comprising a plurality of piezo-electrically operated crystals located on either side of said sensor element for providing vibrating exitation thereto, a capacitive pick off system comprising a segmented cylindrical flange on the outer periphery of said sensor element and a cylinder located circumferentially spaced from said sensor element, and an eddy current forcing system comprising a pair of excitation coils wound around a central post which passes through a central opening in said sensor element, and two forcer assemblies, one of said forcer assemblies being located on either side of said sensor element and each comprising four pole pieces, a forcer coil on each individual one of said forcer pole pieces, a pair of identical ferrite E-Cores operating as a casing for mounting and containing all of the elements of said forcing system and in addition forming the flux return path to complete the forcing magnetic circuit, the inwardmost portions of said E-cores providing the central post around which said excitation coils are positioned, thereby providing an excitation source for the magnetic circuit and the rebalance force path to said sensor element without any physical connection therewith.

* * * * *